US011252626B2

(12) United States Patent
He et al.

(10) Patent No.: US 11,252,626 B2
(45) Date of Patent: Feb. 15, 2022

(54) DATA TRANSMISSION PROTOCOL TO REDUCE DELAY DURING LINK SWITCHOVERS

(71) Applicant: Honeywell International Inc., Morris Plains, NJ (US)

(72) Inventors: Xiaozhong He, Laurel, MD (US); Louis T. Toth, Baltimore, MD (US)

(73) Assignee: Honeywell International Inc., Charlotte, NC (US)

( * ) Notice: Subject to any disclaimer, the term of this patent is extended or adjusted under 35 U.S.C. 154(b) by 88 days.

(21) Appl. No.: 16/742,515

(22) Filed: Jan. 14, 2020

(65) Prior Publication Data

US 2021/0099937 A1 Apr. 1, 2021

Related U.S. Application Data

(60) Provisional application No. 62/908,888, filed on Oct. 1, 2019.

(51) Int. Cl.
*H04W 36/22* (2009.01)
*H04L 12/805* (2013.01)
*H04L 12/741* (2013.01)
*H04L 29/06* (2006.01)

(52) U.S. Cl.
CPC ............ *H04W 36/22* (2013.01); *H04L 45/74* (2013.01); *H04L 47/36* (2013.01); *H04L 69/166* (2013.01)

(58) Field of Classification Search
None
See application file for complete search history.

(56) References Cited

U.S. PATENT DOCUMENTS

| | | | |
|---|---|---|---|
| 7,343,423 B2 | 3/2008 | Goguen et al. | |
| 7,363,534 B1 | 4/2008 | Krishnamurthy et al. | |
| 7,764,609 B1 * | 7/2010 | Woo | H04L 1/22 370/230 |
| 7,894,481 B2 | 2/2011 | van Greunen et al. | |
| 8,331,403 B2 | 12/2012 | Torsner et al. | |
| 8,665,699 B2 | 3/2014 | Bellagamba et al. | |
| 9,444,723 B1 * | 9/2016 | Di Benedetto | H04L 12/4641 |
| 9,779,000 B2 | 10/2017 | Narang et al. | |
| 10,044,603 B1 | 8/2018 | Singh et al. | |
| 2006/0045004 A1 | 3/2006 | Charzinski et al. | |
| 2007/0150939 A1 * | 6/2007 | Aaron | H04L 63/126 726/3 |

(Continued)

OTHER PUBLICATIONS

Lin et al., "Fast Failover and Switchover for Link Failures and Congestion in Software Defined Networks", Communication QoS, Reliability and Modeling Symposium, 2016, pp. 1-6, IEEE ICC.

*Primary Examiner* — Lonnie V Sweet
(74) *Attorney, Agent, or Firm* — Fogg & Powers LLC

(57) ABSTRACT

A method for reducing delay during a link switchover is disclosed. The method comprises determining whether transmission of data in progress is a segmented data transmission, and detecting whether there is a link switchover. If there is a link switchover, the method generates new link characteristic header information for a data packet, and determines a segmentation of the data packet based on the new link characteristic header information. The method then generates segmentation header information for the data packet, and transmits the data packet over a current link.

17 Claims, 6 Drawing Sheets

(56) References Cited

U.S. PATENT DOCUMENTS

| | | | |
|---|---|---|---|
| 2008/0228936 A1* | 9/2008 | Schmid | H04L 65/608 |
| | | | 709/232 |
| 2009/0034528 A1* | 2/2009 | Park | H04L 69/04 |
| | | | 370/392 |
| 2012/0210416 A1* | 8/2012 | Mihelich | H04L 67/1004 |
| | | | 726/11 |
| 2013/0329548 A1 | 12/2013 | Nakil et al. | |
| 2014/0003335 A1 | 1/2014 | Roy | |
| 2016/0337223 A1* | 11/2016 | Mackay | H04L 43/16 |
| 2017/0155580 A1* | 6/2017 | Ramanujan | H04L 45/02 |
| 2019/0268276 A1* | 8/2019 | Lee | H04L 43/10 |
| 2020/0236043 A1* | 7/2020 | Sze | H04L 43/0882 |

* cited by examiner

DATA TRANSMISSION PROTOCOL TO REDUCE DELAY DURING LINK SWITCHOVERS

CROSS REFERENCE TO RELATED APPLICATION

This application claims the benefit of priority to U.S. Provisional Application No. 62/908,888, filed on Oct. 1, 2019, which is herein incorporated by reference.

BACKGROUND

A command and control (C2) link system is needed to support safe unmanned vehicle operation. This system allows switching between the links that constitute the entire C2 link system. A C2 link management system is used to execute actions required to detect available links, make decisions to switch, and execute the switchover.

Currently, when a link is switched, a media change indication is exchanged between the communication peers for the media switchover. The extra message exchanges increase the duration of the switchover and delay user data transmission. The extra message exchanges delay becomes critical, in particular, for low latency unmanned aerial vehicle (UAV) operation. Further, when a link is switched, the link transmission characteristics, such as block size, and lifetime of the data packet, need to be estimated. Those estimates are usually from industry standards, which may not actually represent operation and are static. By setting the block size too small or a longer lifetime, for example, this will add to the delay of a user data transmission.

Thus, a more robust and simple data transmission protocol is needed to minimize the impact of the link switch and reduce the overall delay of data transmission.

SUMMARY

A method for reducing delay during a link switchover is disclosed. The method comprises determining whether transmission of data in progress is a segmented data transmission, and detecting whether there is a link switchover. If there is a link switchover, the method generates new link characteristic header information for a data packet, and determines a segmentation of the data packet based on the new link characteristic header information. The method then generates segmentation header information for the data packet, and transmits the data packet over a current link.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A data transmission protocol to reduce delay during link switchovers is described herein.

As described previously, a command and control (C2) link system is needed to support safe unmanned vehicle operation. The C2 link system allows switching between the links, and a C2 link management system is used to execute actions required to detect available links, make decisions to switch, and execute the switchover. In current systems, when a link is switched, a media change indication is exchanged between the communication peers for the media switchover. The extra message exchanges increase the duration of the switchover and delay user data transmission. Further, when a link is switched, the link transmission characteristics, such as block size and lifetime of the data packet, need to be estimated. By setting the block size too small or for a longer lifetime, this will add to the delay of a data transmission.

The present approach provides a more robust and simple data transmission protocol, which minimizes the impact of the link switch and reduces the overall delay of data transmission. The data transmission protocol embeds link switch information in a data transmission unit when a link layer connection fails and has to be switched over to another link layer connection. When link switchover happens, the maximum link layer data unit size can change. The present method dynamically changes the segment size so that the segment can fit in the data transmission unit for the new link. The new segmentation information is conveyed in the data transmission unit and sent over the new link.

Figure 1:
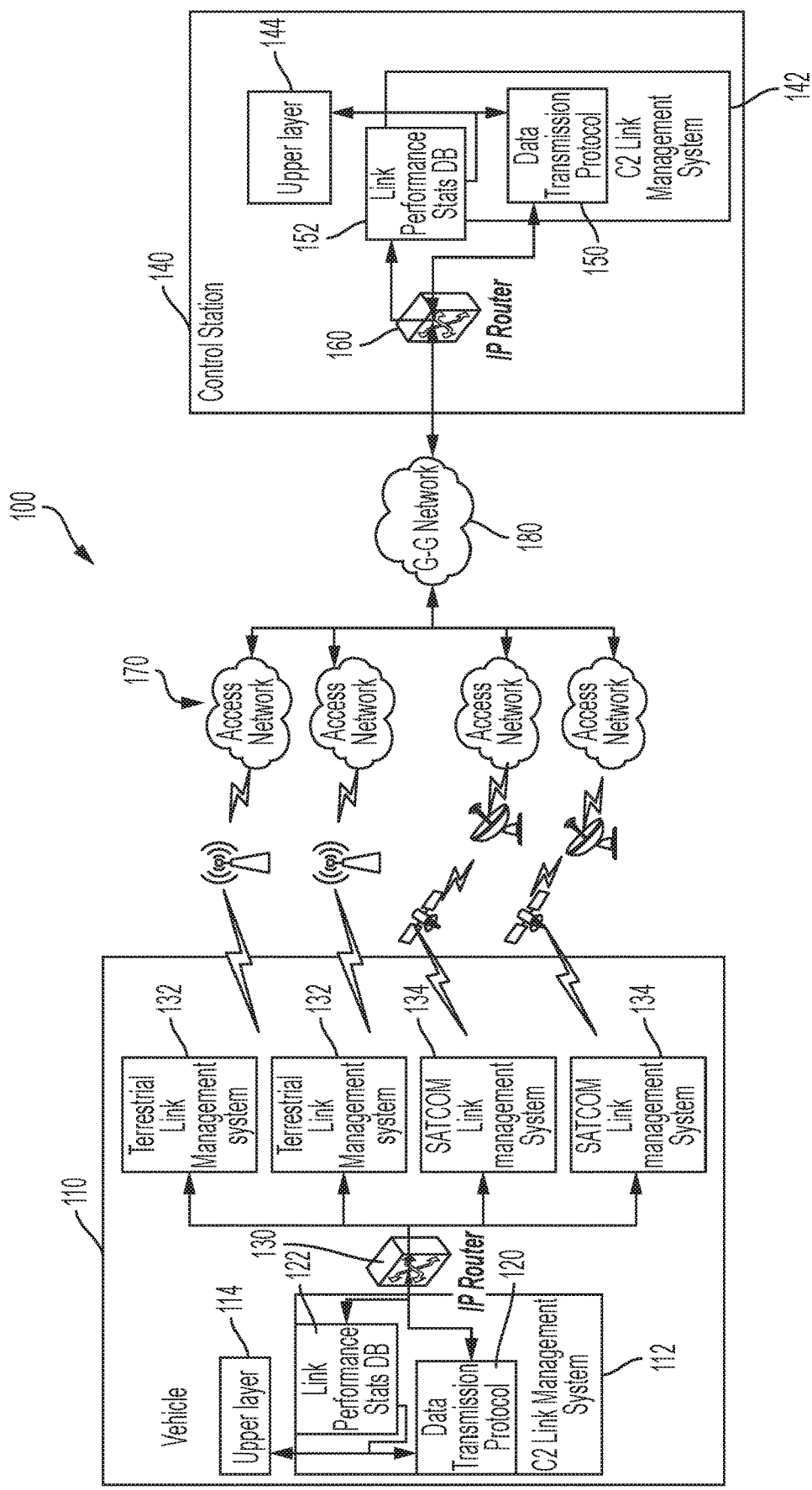
FIG. 1 is a schematic block diagram of a system implemented with a data transmission protocol to reduce delay during link switchovers, according to an exemplary embodiment.

FIG. 1 is a schematic block diagram illustrating a system 100, which can be implemented with the data transmission protocol to reduce delay during link switchovers, according to an example embodiment. The system 100 includes a vehicle 110, which is in operative communication with a control station 140 through various access networks 170, such as SATCOM, cellular, WiFi and the like.

The vehicle 110 houses a C2 link management system 112, which is in operative communication with a network upper layer 114, such as a transport layer protocol, including TCP and UDP, over a network layer protocol like IP. The C2 link management system 112 hosts a first data transmission protocol 120 according to the present approach, and a link performance statistics database 122 that communicates with data transmission protocol 120.

The data transmission protocol 120 can receive data from upper layer 114, if needed, and segments the data into a data packet that is fit to a current connected link. Each data packet includes a link identification (ID) used to identify the current connected link, link connection characteristic information that is necessary for the receiver to send acknowledgement and/or data transmission, and other link characteristic information such as lifetime. Each data packet also includes the necessary segmentation information (e.g., segmentation ID, total segmentation, etc.) that is needed for a peer to re-assemble the data packets.

The C2 link management system 112 also monitors and collects link performance data, such as current maximum data packet, delay of each data packet transmitted, etc., in link performance statistics database 122. These performance data are used by data transmission protocol 120 to determine the new link transmission characteristics (such as lifetime and packet size) when a link is switched. If no link performance data is available, a default can be used.

The vehicle 110 also has an IP router 130, which provides communication pathways between data transmission protocol 120, and one or more terrestrial link management systems 132 or one or more SATCOM link management systems 134, which in turn communicate with access networks 170. The control station 140 communicates with access networks 470 through a ground-ground (G-G) network 180.

The control station 140 houses a C2 link management system 142, which is in operative communication with a network upper layer 144. The C2 link management system 142 hosts a second data transmission protocol 150 according to the present approach, which is a ground-based peer to data transmission protocol. The C2 link management system 142 also hosts a link performance statistics database 152 that communicates with data transmission protocol 150. The data transmission protocol 150 can receive data from upper layer 144, if needed, and segments the data into a data packet that is fit to a current connected link. The control station 140 also has an IP router 160, which provides communication pathways between data transmission protocol 450, and G-G network 180.

When on the receiving end of data packets coming from data transmission protocol 120, data transmission protocol 150 first checks whether a data packet is segmented. If not, the data packet is sent to network upper layer 144. The data transmission protocol 150 also checks whether a link ID is changed. If the link ID is changed, data transmission protocol 150 processes the link switch and starts sending any acknowledgement or data over to the new link. If data is segmented, data transmission protocol 150 will re-assemble the data until all the data packets have been received, and then forward the assembled data packet to network upper layer 144. Note that the performance data is also collected at a receiving peer to determine the link characterize information when a link switchover indication is received.

Likewise, data transmission protocol 120 also has a receiving end to reassemble data packets coming from data transmission protocol 150, and operates in a similar manner as described above for the receiving end of data transmission protocol 150.

Further details of the present data transmission protocol are described as follows.

Figure 2:
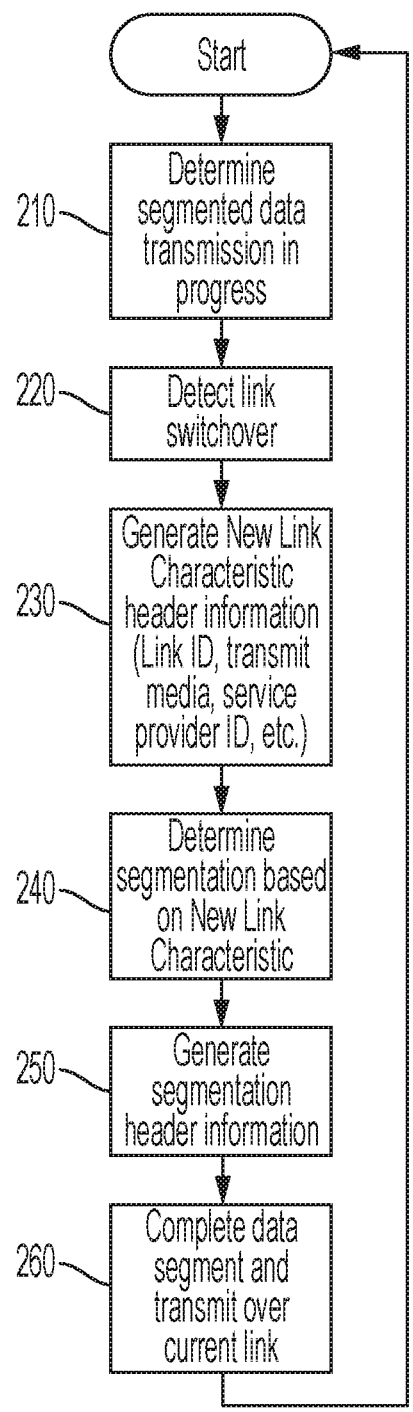
FIG. 2 is a process flow diagram of the steps generally performed by the data transmission protocol implemented in the system of FIG. 1.

FIG. 2 is a process flow diagram of the steps generally performed by the present data transmission protocol, such as implemented in the system of FIG. 1. After start of the process, the protocol determines whether segmented data transmission is in progress (block 210), and detects whether there is a link switchover (block 220). The protocol then generates new link characteristic header information (e.g., link ID, transmit media, service provider ID, etc.) (block 230). The protocol then determines segmentation based on the new link characteristic (block 240), and generates segmentation header information (block 250). The protocol then completes the data segment and transmits the data segment over the current (new) link (block 260). The protocol then returns back to the start to repeat this process.

Figure 3A:
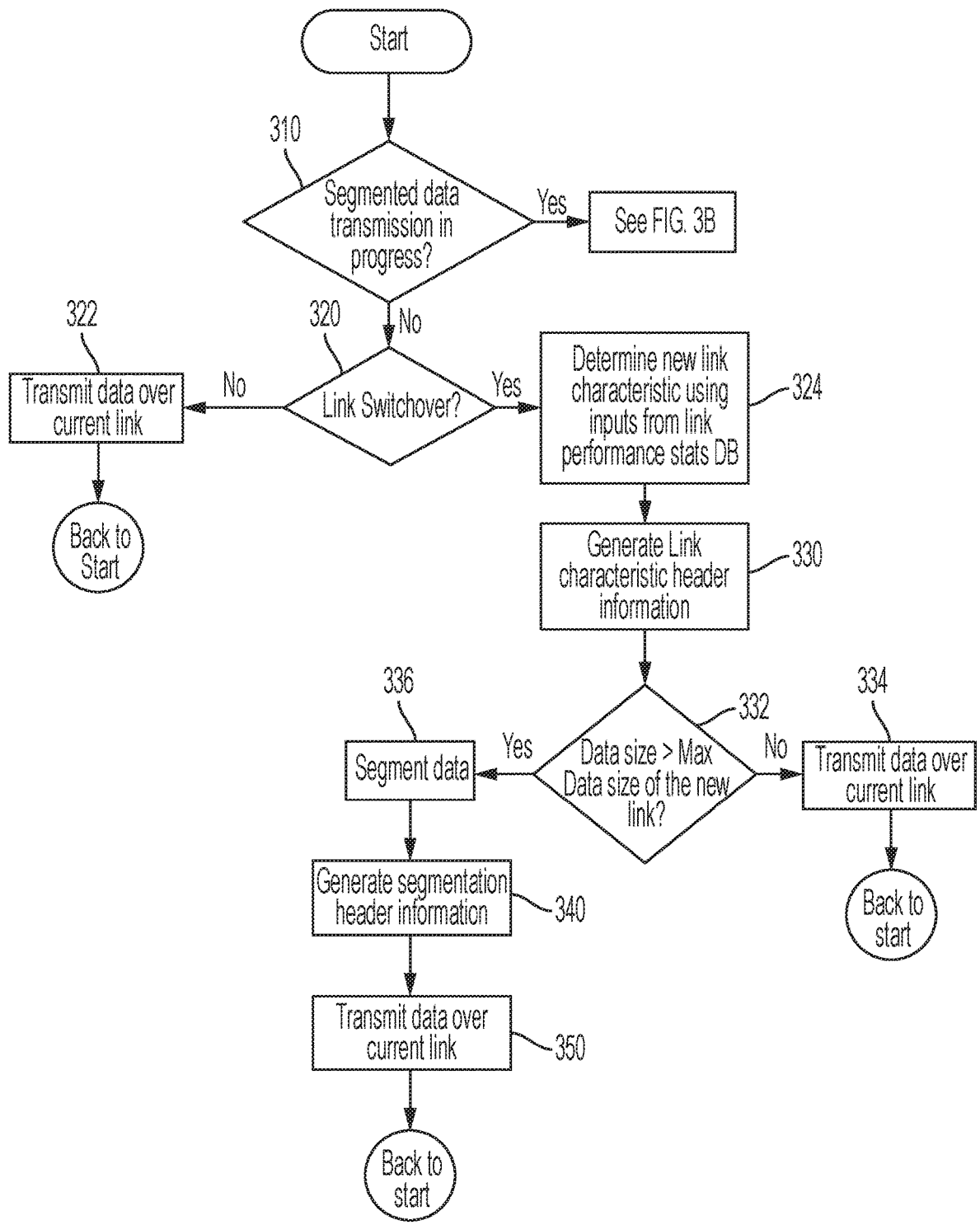
FIGS. 3A and 3B are process flow diagrams showing further details of the logic steps performed by the data transmission protocol implemented on the sender side of the system.
Figure 3B:
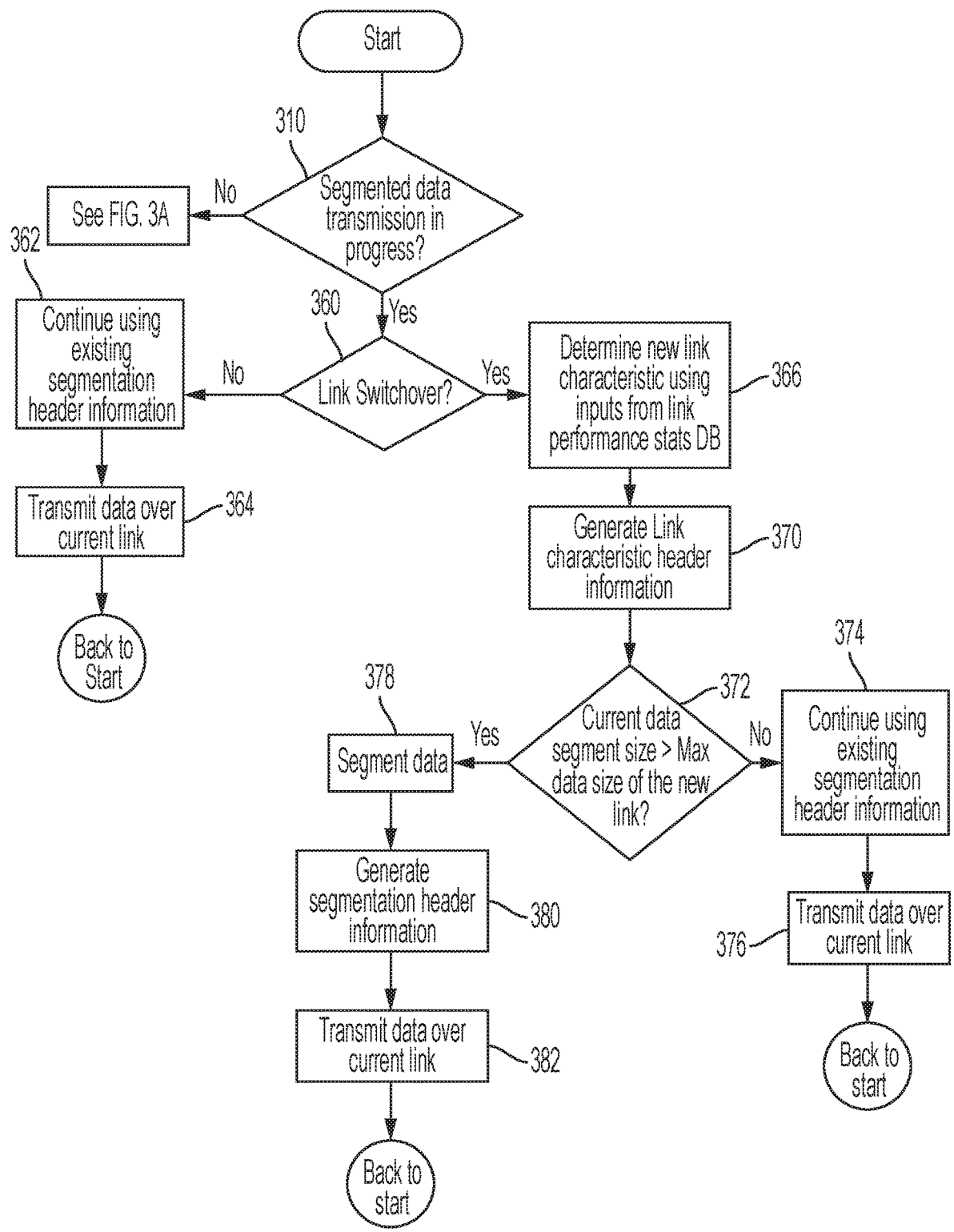

FIGS. 3A and 3B are process flow diagrams showing further details of the logic steps performed by the data transmission protocol on the sender side of the system. After start (FIG. 3A), the protocol determines whether segmented data transmission is in progress (block 310). If yes, then the process continues as shown in FIG. 3B (discussed below). If segmented data transmission is not in progress, the protocol detects whether there is a link switchover (block 320). If no, the data is transmitted over the current link (block 322), and the protocol goes back to the start to repeat the above process. If there is a link switchover, the protocol determines a new link characteristic using inputs from a link performance statistics database (block 324). The protocol then generates link characteristic header information (block 330). The protocol then determines if the data size is greater than a maximum data size of the new link (block 332). If no, the data is transmitted over the current (new) link (block 334), and the protocol goes back to the start to repeat the above process. If the data size is greater than a maximum data size of the new link, the protocol segments the data (block 336), and generates segmentation header information (block 340). The protocol then transmits the data segment over the current (new) link (block 350). The protocol then returns back to the start to repeat this process.

Returning to start as shown in FIG. 3B, the protocol determines whether segmented data transmission is in progress (block 310). If no, then the process continues as shown in FIG. 3A (discussed above). If segmented data transmission is in progress, the protocol detects whether there is a link switchover (block 360). If no, the protocol continues using the existing segmentation header information (block 362), and the data is transmitted over the current link (block 364). The protocol then goes back to the start to repeat the above process. If there is a link switchover, the protocol determines a new link characteristic using inputs from the link performance statistics database (block 366). The protocol then generates link characteristic header information (block 370). The protocol then determines if the current data segment size is greater than a maximum data size of the new link (block 372). If no, the protocol continues using the existing segmentation header information (block 374), and the data is transmitted over the current (new) link (block 376). The protocol then goes back to the start to repeat the above process. If the current data segment size is greater than a maximum data size of the new link, the protocol segments the current data segment (block 378), and generates segmentation header information (block 380). The protocol then transmits the data over the current (new) link (block 382). The protocol then returns back to the start to repeat this process.

Figure 4:
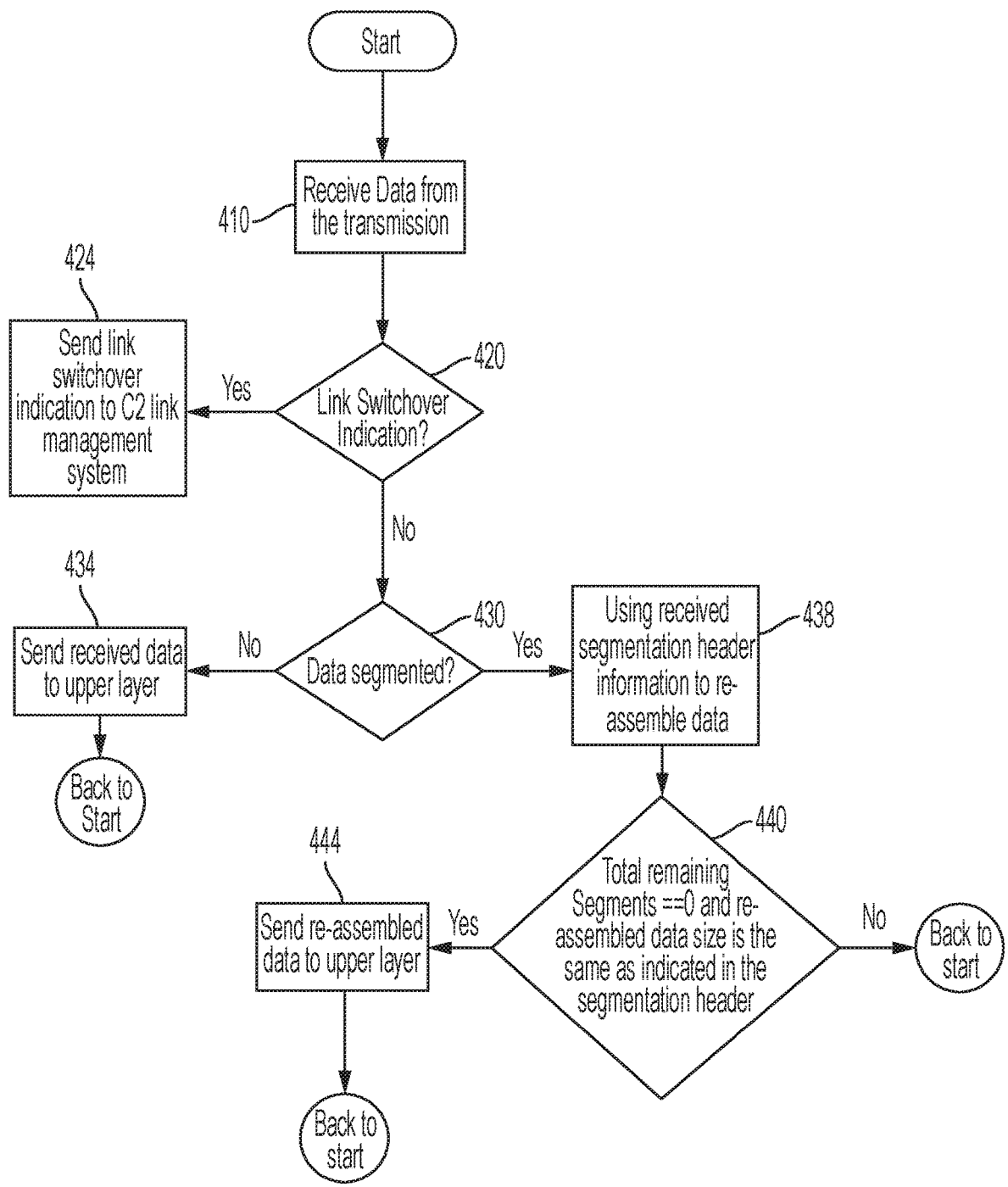
FIG. 4 is a process flow diagram showing further details of the logic steps performed by the data transmission protocol on the receiver side of the system.

FIG. 4 is a process flow diagram showing further details of the logic steps performed by the data transmission protocol on the receiver side of the system. After start, the protocol receives data from the transmission (block 410), and determines whether there is a link switchover indication (block 420). If yes, the protocol sends the link switchover indication to the C2 link management system (block 424); if no, the protocol determines whether the data is segmented (block 430). If the data is not segmented, the protocol sends the received data to the network upper layer (block 434). The protocol then returns back to the start to repeat this process. If the data is segmented, the protocol uses the received segmentation header information to re-assemble the data (block 438). The protocol then determines whether the total remaining segments are equal to zero and the re-assembled data size is the same as indicated in the segmentation header (block 440). If no, the protocol returns back to the start to repeat the above process; if yes, the protocol sends the re-assembled data to the network upper layer (block 444), and returns back to the start to repeat the foregoing process of FIG. 4.

Figure 5:
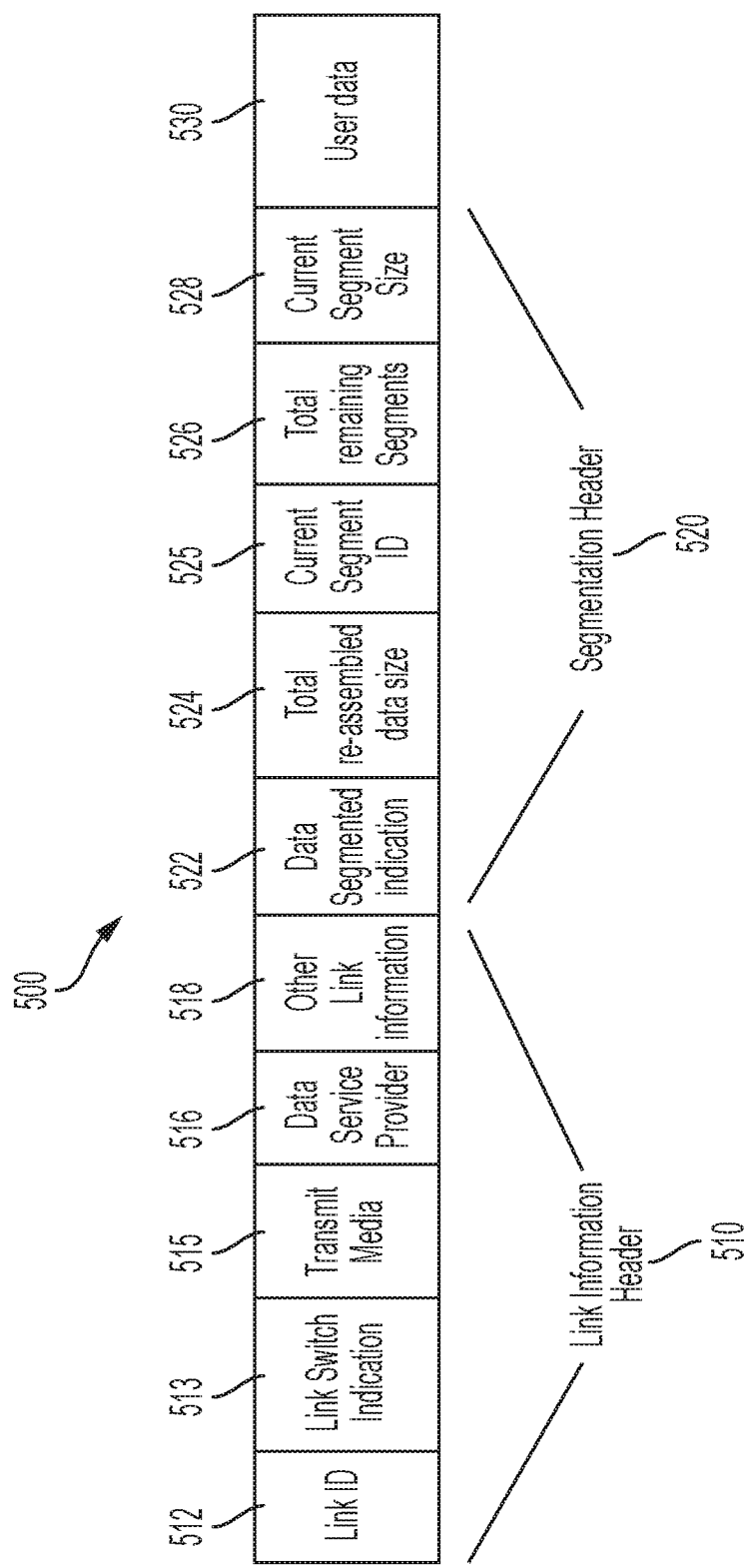
FIG. 5 is a schematic representation of the general format of a data packet, which can be used in the data transmission protocol, according to an example embodiment.

FIG. 5 is a schematic representation of the general format of a data packet 500, which can be used in the present data transmission protocol, according to an example embodiment. The data packet 500 includes a link information header 510, a segmentation header 520, and user data 530. The link information header 510 includes a link ID 512, a link switch indication 513, transmit media 515, a data service provider 516, and other link information 518. The segmentation header 520 includes a data segmented indication 522, a total re-assembled data size 524, a current segment ID 525, total remaining segments 526, and a current segment size 528.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for reducing delay during a link switchover, the method comprising: (a) determining whether transmission of data in progress is a segmented data transmission; (b) detecting whether there is a link switchover; (c) if there is a link switchover, generating new link characteristic header information for a data packet; (d) determining a segmentation of the data packet based on the new link characteristic header information; (e) generating segmentation header information for the data packet; and (f) transmitting the data packet over a current link.

Example 2 includes the method of Example 1, wherein when the transmission of data is not a segmented data transmission, and there is a link switchover, the method further comprising: determining a characteristic for a new link using one or more inputs from a link performance statistics database; generating characteristic header information for the new link; and determining whether a size of the data is greater than a maximum data size of the new link.

Example 3 includes the method of Example 2, wherein if the size of the data is not greater than the maximum data size of the new link, the method further comprising: transmitting the data over the new link; and repeating the method of Example 1 starting at step (a).

Example 4 includes the method of Example 2, wherein if the size of the data is greater than the maximum data size of the new link, the method further comprising: segmenting the data; generating segmentation header information for the segmented data; transmitting the segmented data over the new link; and repeating the method of Example 1 starting at step (a).

Example 5 includes the method of any of Examples 1-4, wherein when the transmission of data is not a segmented data transmission, and there is not a link switchover, the method further comprising: transmitting the data over a current link; and repeating the method of Example 1 starting at step (a).

Example 6 includes the method of Example 1, wherein when the transmission of data is a segmented data transmission, and there is a link switchover, the method further comprising: determining a characteristic for a new link using one or more inputs from a link performance statistics database; generating characteristic header information for the new link; and determining whether a size of a current data segment is greater than a maximum data size of the new link.

Example 7 includes the method of Example 6, wherein when the size of the current data segment is not greater than a maximum data size of the new link, the method further comprising: continue using existing segmentation header information; transmitting the current data segment over the new link; and repeating the method of Example 1 starting at step (a).

Example 8 includes the method of Example 6, wherein when the size of the current data segment is greater than a maximum data size of the new link, the method further comprising: segmenting the current data segment; generating segmentation header information for the segmented current data segment; transmitting the segmented current data segment over the new link; and repeating the method of Example 1 starting at step (a).

Example 9 includes the method of Example 1, wherein when the transmission of data is a segmented data transmission, and there is no link switchover, the method further comprising: continue using existing segmentation header information; transmitting a current data segment over a current link; and repeating the method of Example 1 starting at step (a).

Example 10 includes the method of any of Examples 1-9, wherein the data packet includes a link information header, a segmentation header, and user data.

Example 11 includes the method of Example 10, wherein the link information header includes link identification (ID), a link switch indication, transmit media, data service provider, and other link information.

Example 12 includes the method of any of Examples 10-11, wherein the segmentation header includes a data segmented indication, total re-assembled data size, current segment ID, total remaining segments, and current segment size.

Example 13 includes a method for reducing delay during link switchovers, the method comprising: (a) receiving data from a transmission; (b) determining whether there is a link switchover indication; (c) if there is not a link switchover indication, determining whether the data is segmented; (d) if the data is segmented, using received segmentation header information to re-assemble the data; (e) determining whether total remaining segments is equal to zero and the re-assembled data size is the same as indicated in the segmentation header information; and (f) if the total remaining segments is equal to zero and the re-assembled data size is the same as indicated in the segmentation header information, sending the re-assembled data to a network upper layer.

Example 14 includes the method of Example 13, wherein when there is a link switchover indication, the method further comprising: sending the link switchover indication to a command and control link management system.

Example 15 includes the method of Example 13, wherein when the data is not segmented, the method further comprising: sending the received data to a network upper layer; and repeating the method of Example 13 starting at step (a).

Example 16 includes the method of Example 13, wherein if the total remaining data segments is not equal to zero and the re-assembled data size is not the same as indicated in the received segmentation header information, the method further comprising: repeating the method of Example 13 starting at step (a).

Example 17 includes a system comprising: a first link management system located onboard each of one or more vehicles; and a second link management system located in a control station, the second link management system in operative communication with the first link management system onboard each of the one or more vehicles; wherein the first link management system and the second link management system each host a data transmission protocol, and a link performance statistics database that communicates with the data transmission protocol; wherein each data transmission protocol is operative to perform a method for reducing delay during a link switchover, the method comprising: determining whether transmission of data in progress is a segmented data transmission; detecting whether there is a link switchover; if there is a link switchover, generating new link characteristic header information for a data packet; determining a segmentation of the data packet based on the new link characteristic header information; generating segmentation header information for the data packet; and transmitting the data packet over a current link.

Example 18 includes the system of Example 17, wherein the first link management system is operative to communicate with the second link management system through one or more access networks.

Example 19 includes the system of any of Examples 17-18, wherein the first link management system and the second link management system are each in operative communication with a network upper layer.

Example 20 includes the system of any of Examples 17-19, wherein when on a receiving end of data packets coming from a data transmission, each data transmission protocol is operative to perform a method comprising: determining whether there is a link switchover indication; if there is not a link switchover indication, determining whether the data is segmented; if the data is segmented, using received segmentation header information to re-assemble the data; determining whether total remaining segments is equal to zero and the re-assembled data size is the same as indicated in the segmentation header information; and if the total remaining data segments is equal to zero and the re-assembled data size is the same as indicated in the segmentation header information, sending the re-assembled data to a network upper layer.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for reducing delay during a link switchover, the method comprising:
    (a) determining whether transmission of data in progress is a segmented data transmission;
    (b) detecting whether there is a link switchover;
    (c) if there is a link switchover, generating new link characteristic header information for a data packet;
    (d) determining a segmentation of the data packet based on the new link characteristic header information;
    (e) generating segmentation header information for the data packet; and
    (f) transmitting the data packet over a current link;
    wherein the data packet includes a link information header, a segmentation header, and user data;
    wherein the link information header includes link identification (ID), a link switch indication, transmit media, data service provider, and other link information.

2. The method of claim 1, wherein when the transmission of data is not a segmented data transmission, and there is a link switchover, the method further comprising:
    determining a characteristic for a new link using one or more inputs from a link performance statistics database;
    generating characteristic header information for the new link; and
    determining whether a size of the data is greater than a maximum data size of the new link.

3. The method of claim 2, wherein if the size of the data is not greater than the maximum data size of the new link, the method further comprising:
    transmitting the data over the new link; and
    repeating the method of claim 1 starting at step (a).

4. The method of claim 2, wherein if the size of the data is greater than the maximum data size of the new link, the method further comprising:
    segmenting the data;
    generating segmentation header information for the segmented data;
    transmitting the segmented data over the new link; and
    repeating the method of claim 1 starting at step (a).

5. The method of claim 1, wherein when the transmission of data is not a segmented data transmission, and there is not a link switchover, the method further comprising:
    transmitting the data over a current link; and
    repeating the method of claim 1 starting at step (a).

6. The method of claim 1, wherein when the transmission of data is a segmented data transmission, and there is a link switchover, the method further comprising:
    determining a characteristic for a new link using one or more inputs from a link performance statistics database;

generating characteristic header information for the new link; and determining whether a size of a current data segment is greater than a maximum data size of the new link.

7. The method of claim 6, wherein when the size of the current data segment is not greater than a maximum data size of the new link, the method further comprising:

continue using existing segmentation header information;

transmitting the current data segment over the new link; and repeating the method of claim 1 starting at step (a).

8. The method of claim 6, wherein when the size of the current data segment is greater than a maximum data size of the new link, the method further comprising:

segmenting the current data segment;

generating segmentation header information for the segmented current data segment;

transmitting the segmented current data segment over the new link; and repeating the method of claim 1 starting at step (a).

9. The method of claim 1, wherein when the transmission of data is a segmented data transmission, and there is no link switchover, the method further comprising:

continue using existing segmentation header information;

transmitting a current data segment over a current link; and repeating the method of claim 1 starting at step (a).

10. The method of claim 1, wherein the segmentation header includes a data segmented indication, total re-assembled data size, current segment ID, total remaining segments, and current segment size.

11. A method for reducing delay during link switchovers, the method comprising:

(a) receiving data from a transmission;

(b) determining whether there is a link switchover indication;

(c) if there is not a link switchover indication, determining whether the data is segmented;

(d) if the data is segmented, using received segmentation header information to re-assemble the data;

(e) determining whether total remaining segments is equal to zero and the re-assembled data size is the same as indicated in the segmentation header information; and (f) if the total remaining segments is equal to zero and the re-assembled data size is the same as indicated in the segmentation header information, sending the re-assembled data to a network upper layer;

wherein when there is a link switchover indication, the method further comprising:

sending the link switchover indication to a command and control link management system.

12. The method of claim 11, wherein when the data is not segmented, the method further comprising:

sending the received data to a network upper layer; and repeating the method of claim 11 starting at step (a).

13. The method of claim 11, wherein if the total remaining data segments is not equal to zero and the re-assembled data size is not the same as indicated in the received segmentation header information, the method further comprising:

repeating the method of claim 11 starting at step (a).

14. A system comprising:

a first link management system located onboard each of one or more vehicles; and a second link management system located in a control station, the second link management system in operative communication with the first link management system onboard each of the one or more vehicles;

wherein the first link management system and the second link management system each host a data transmission protocol, and a link performance statistics database that communicates with the data transmission protocol;

wherein each data transmission protocol is operative to perform a method for reducing delay during a link switchover, the method comprising:

determining whether transmission of data in progress is a segmented data transmission;

detecting whether there is a link switchover;

if there is a link switchover, generating new link characteristic header information for a data packet;

determining a segmentation of the data packet based on the new link characteristic header information;

generating segmentation header information for the data packet; and transmitting the data packet over a current link.

15. The system of claim 14, wherein the first link management system is operative to communicate with the second link management system through one or more access networks.

16. The system of claim 14, wherein the first link management system and the second link management system are each in operative communication with a network upper layer.

17. The system of claim 14, wherein when on a receiving end of data packets coming from a data transmission, each data transmission protocol is operative to perform a method comprising:

determining whether there is a link switchover indication;

if there is not a link switchover indication, determining whether the data is segmented;

if the data is segmented, using received segmentation header information to re-assemble the data;

determining whether total remaining segments is equal to zero and the re-assembled data size is the same as indicated in the segmentation header information; and if the total remaining data segments is equal to zero and the re-assembled data size is the same as indicated in the segmentation header information, sending the re-assembled data to a network upper layer.

* * * * *